United States Patent
Morel

(10) Patent No.: US 6,814,117 B1
(45) Date of Patent: Nov. 9, 2004

(54) JUNCTION OF A TREAD WITH THE SIDEWALLS OF A TIRE

(75) Inventor: Noël Morel, Enval (FR)

(73) Assignee: Compagnie Generale des Etablissements Michelin-Michelin & Cie, Clermont-Ferrand Cedex (FR)

( * ) Notice: Subject to any disclaimer, the term of this patent is extended or adjusted under 35 U.S.C. 154(b) by 0 days.

(21) Appl. No.: 09/641,417

(22) Filed: Aug. 16, 2000

Related U.S. Application Data

(63) Continuation of application No. PCT/EP99/00906, filed on Feb. 12, 1999.

(30) Foreign Application Priority Data

Feb. 20, 1998 (FR) .............................. 98 02168

(51) Int. Cl.⁷ .......................... B60C 3/00; B60C 13/02; B60C 11/01
(52) U.S. Cl. ................ 152/454; 152/523; 152/209.16; 152/209.18
(58) Field of Search ............................ 152/454, 523, 152/525, 539, 548, 209.16, 209.18

(56) References Cited

U.S. PATENT DOCUMENTS 3,818,964 A * 6/1974 Maiocchi ............... 152/209.16
4,445,560 A * 5/1984 Musy ......................... 152/200
4,527,606 A * 7/1985 Kita ......................... 152/209.5
5,301,728 A * 4/1994 Brown, Jr. ............. 152/209.14
5,511,599 A * 4/1996 Willard, Jr. ................. 152/454
5,769,976 A * 6/1998 Omokawa .................... 152/209

FOREIGN PATENT DOCUMENTS

| EP | 0072500 | 2/1983 |
|---|---|---|
| GB | 2077671 | 12/1981 |
| JP | 09-136512 | * 5/1997 |

* cited by examiner

Primary Examiner—Blaine Copenheaver
Assistant Examiner—Justin Fischer
(74) Attorney, Agent, or Firm—Baker Botts L.L.P.

(57) ABSTRACT

A tire having a carcass reinforcement, a crown reinforcement and a tread joined to two beads by means of two sidewalls, the axially outer edges of the single mix of the tread being folded over on to the radially outer edges of the rubber mixes of the sidewalls, and the circular junction J between the sole rubber mix of the tread and the rubber mix of the sidewall being positioned such that its radius $R_C$ on the axially outer wall of the tire lies firstly between $0.9\ R_S + 0.1\ R_B$ and $0.8\ R_S + 0.2\ R_B$ and secondly between $R_{SS}$ and $0.9\ R_{SS} + 0.1\ R_B$, $R_S$ being the equatorial crown radius of the tread, $R_{SS}$ the equatorial radius of the center line of the carcass reinforcement and $R_B$ the radius of the bead seat.

5 Claims, 2 Drawing Sheets

JUNCTION OF A TREAD WITH THE SIDEWALLS OF A TIRE

This is a continuation of PCT/EP99/00906 filed on Feb. 12, 1999.

BACKGROUND OF THE INVENTION

The invention relates to a tire having a carcass reinforcement, preferably a radial one, intended to be fitted more particularly on a passenger vehicle.

In addition to the carcass reinforcement, which is anchored within each bead to at least one bead wire, said tire comprises radially to the outside of said carcass reinforcement a crown reinforcement composed of at least two so-called working crown plies formed of inextensible reinforcement elements, which are parallel to each other within each ply and are crossed from one ply to the next, forming angles which may be between 10° and 45° with the circumferential direction. The tread, which is arranged radially to the outside of said crown reinforcement, is joined to the two beads of the tire by means of two sidewalls on either side of the equatorial plane.

As is widely known and used, the junction with the shoulders of the tire, between the rubber mix of the tread and the two rubber sidewall mixes, can be brought about in two ways. A first method consists in folding the radially upper edges of the sidewall mixes over the axially outer edges of the tread mix. Said method, when laying the sidewall mixes on the cylindrical shaping drum for the non-vulcanized carcass blank, requires the non-adhesion of the upper edges of the sidewall mixes, then the folding of said non-adhering edges on to the wings of tread mix during the finishing of the non-vulcanized tire blank. The operations referred to above may in some cases be tricky.

A second method frequently used consists firstly of folding down the wings of tread mix over the upper edges of the sidewall mixes, said edges, during the building of the tire blank, being glued to the radially subjacent mixes. The junction between the tread mix and the sidewall mixes, which is on the outer wall of the sidewall in the form of a more or less regular circle, is then covered with a layer of rubber mix or joint cover, of a quality close to that of the sidewall mixes. This latter solution permits good strength of the junction and good life of the tire at this level, but requires the laying of an additional product, and therefore a certain disadvantage in terms of material and production costs.

Despite the possible tapering of the tread wings so as to facilitate the folding over thereof, since the materials used for the tread mixes and sidewall mixes are generally very different and the mechanical stresses due to the loading of the tire in the contact area and imposed on the shoulders of said tire are high, it has not been possible to dispense with the use of the joint cover over the junction between the tread and sidewalls, since the life of the junction is not judged sufficient for intensive, severe highway use.

SUMMARY OF THE INVENTION

The object of the invention is to dispense with the use of the joint cover while using the second method of building the tire blank.

The tire according to the invention, comprising a carcass reinforcement anchored within each bead to a bead wire, a crown reinforcement and a tread joined to two beads by means of two sidewalls, the axially outer edges of the single mix of the tread being folded over on to the radially outer edges of the rubber mixes of the sidewalls, is characterized in that the circular junction between the sole rubber tread mix and the rubber sidewall mix is positioned on the axially outer wall of the tire such that its radius $R_C$ lies firstly between $0.9\,R_S+0.1\,R_B$ and $0.8\,R_S+0.2\,R_B$ and secondly between $R_{SS}$ and $0.9\,R_{SS}+0.1\,R_B$, $R_S$ being the equatorial crown radius of the tread, $R_{SS}$ the equatorial radius of the center line of the carcass reinforcement and $R_B$ the radius of the bead seat measured on the line perpendicular to the axis of rotation of the tire passing through the center of gravity of the cross-section of the bead wire.

Such positioning permits a serious reduction in the deformation which the circular junction between the tread mix and the sidewall mix undergoes, and consequently substantially improved strength of the bond.

Preferably, the circular junction between the mixes in question is close to at least one circumferential groove or channel, the mean radius $R_R$ of which is between $R_C+10$ mm and $R_C-10$ mm, and the depth of which is between 10 and 30% of the total sidewall thickness at the radius $R_R$. It is advantageous for the channel to have a mean radius of between $R_C$ and $R_C-10$ mm in order to have maximum effectiveness. The cross-section of said groove may be semicircular, or alternatively may, when viewed in meridian section, have a shape which is a succession of arcs of a circle.

The characteristics of the invention will be better understood with reference to the following description, which refers to the drawings which illustrate in non-limitative manner examples of embodiments of the invention.

DESCRIPTION OF PREFERRED EMBODIMENTS

Figure 1:
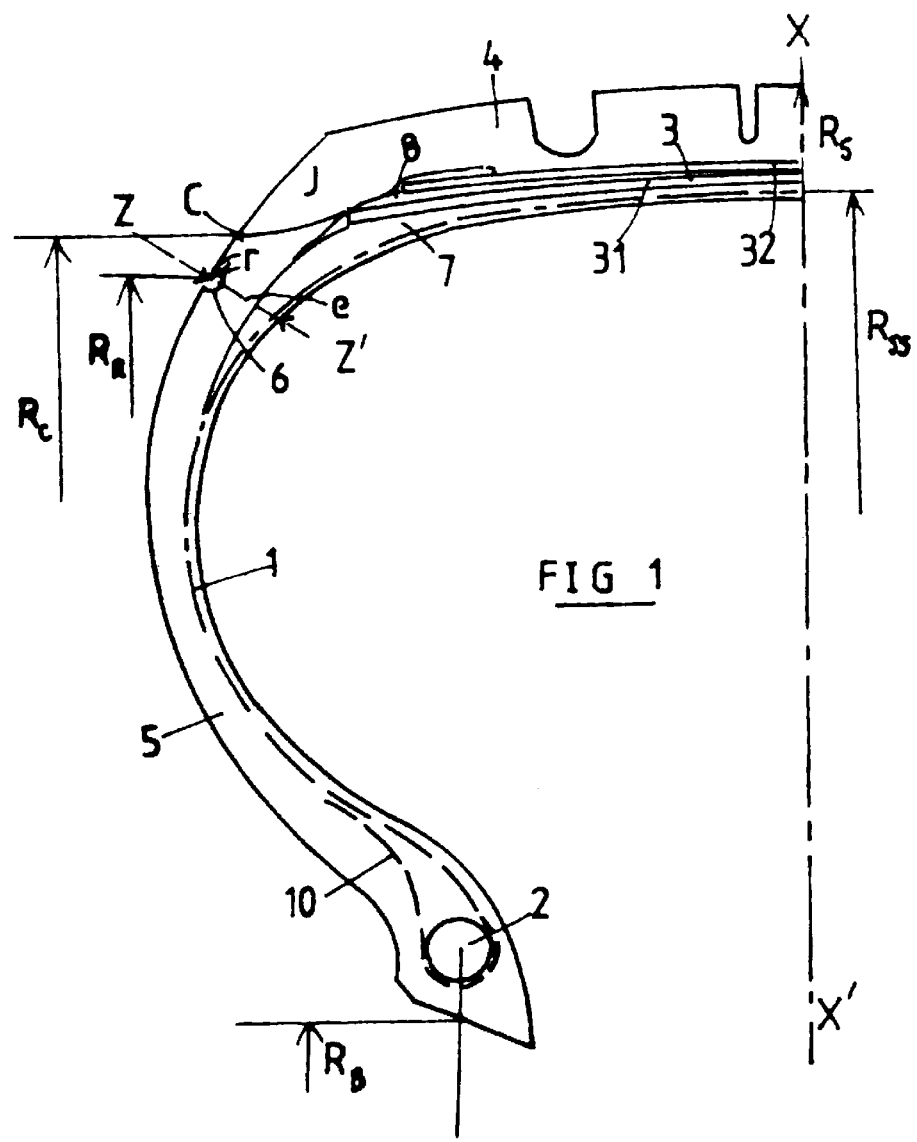
FIG. 1 is a diagram, viewed in meridian section, of a tire according to the invention.

The tire of dimension 175/70 R.13 comprises a carcass reinforcement formed of a single ply 1 of radial reinforcement elements which are textile cables, such as cables of aliphatic polyamide, or of PET, or of rayon. Said ply 1 winds within each bead around a bead wire 2 of braided type to form an upturn 10. The carcass reinforcement 1 is surmounted radially to the outside by a crown reinforcement 3 composed of two working plies 31 and 32 formed of inextensible metal 6×23 NF cables made of steel which are parallel to each other within each ply and are crossed from one ply 31 to the next 32, forming an angle α of 22° with the circumferential direction of the tire. The edges of said crown reinforcement 3 are separated from the carcass ply 1 by rubber profiled elements 7, whereas the edges of the working plies 31 and 32 are separated from each other by rubber wedges 8 of suitable quality. The tread 4 radially surmounting the crown reinforcement 3 is joined on either side of the equatorial plane XX' to a sidewall 5 via a junction J having on the axially outer wall of the tire a substantially circular trace C having a radius $R_C$. If the radius $R_S$ of the circular trace on the equatorial plane XX' of the points of the tread 4 which are farthest from the axis of rotation of the tire, the radius $R_{SS}$ of the virtually circular trace on the equatorial plane XX' of the points of the average surface of the carcass reinforcement 1, and the radius $R_B$ of the bead seat measured in a plane parallel to the equatorial plane XX' and passing through the center of gravity of the section of the bead wire 2 are considered, the radius $R_C$ is equal to 268 mm, or firstly equal to 0.83 $R_S$+0.17 $R_B$, given that $R_S$ is equal to 289 mm and $R_B$ to 163 mm, and secondly equal to 0.93 $R_{SS}$+0.07 $R_B$, given that $R_{SS}$ is equal, for the dimension in question, to 275 mm.

Radially to the inside of the circular trace C there is arranged a groove 6) of semicircular cross-section, the central axis ZZ' of which, viewed in meridian section, intersects the lateral wall of the tire at a point of the radius $R_R$ lower than the radius $R_C$ by an amount equal to 6 mm. Said groove 6 has a depth, which in the present case corresponds to a radius r, of 2.0 mm, which is equal to 25% of the thickness e of the sidewall of the tire, measured on the axis ZZ' and equal to 8 mm. The groove 6, which is close to the junction J, makes it possible additionally to reduce the deformations on the sidewall of the tire at the level of said junction between the tread mix and the sidewall mix.

Figure 2:
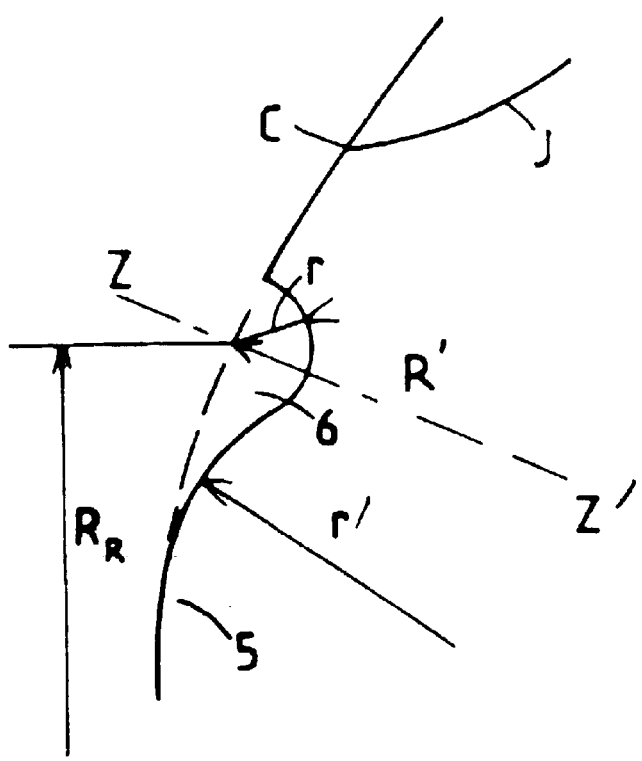
FIG. 2 is a diagram, viewed in meridian section, of a variant of the shape of the channel.

FIG. 2 shows another form of circumferential groove 6, which can be defined by the succession of two arcs of a circle viewed in meridian section: a first, radially upper, concave, arc of a circle, of radius r and of a length of between $\pi r/2$ and $\pi r$, extended tangentially by a second, convex, arc of a circle, the radius of curvature r' of which lies between r and R', R' being the radius of curvature of the outer wall of the sidewall measured at the radius $R_R$, said second arc of a circle also being tangent to said outer wall. In the case described, the radius r is 2 mm, whereas the radius r' is 50 mm, R' being equal to 80 mm.

It is possible, if necessary, to add a second groove, of the same type as the groove 6, arranged radially to the outside of the junction J and substantially at the same radial distance from said junction.

Tests carried out on tires in accordance with the invention (FIG. 1) demonstrate the good endurance of the junction between the tread and the sidewalls of the tire, both when traveling with an excess load and when traveling in ozone-containing conditions. The presence of a groove permits a reduction in the deformation to which the junction is subjected, and tires of this design have recorded mileages, before the appearance of incipient separation during travel under ozone-containing conditions, which are 1.5 higher than those of tires which do not comprise grooves.

I claim:

1. A highway vehicle tire, comprising two beads, a bead wire within each bead, a crown reinforcement, a tread comprising a single mix of rubber, and two rubber sidewall mixes radially connecting the tread to the beads, with the axially outer edges of the tread mix being folded over onto the radially outer edges of the rubber mixes of the sidewalls to form a junction therewith at each of the axially outer edges of the tread, wherein each said junction comprises a circular junction J between the single rubber mix of the tread and the single rubber mix of the adjacent sidewall forming on the axially outer wall of the tire a substantially circular trace of radius $R_C$ relative to the axis of rotation of the tire, said radius $R_C$ lying, firstly, between 0.9 $R_S$+0.1 $R_B$ and 0.8 $R_S$+0.2 $R_B$ and, secondly, between $R_{SS}$ and 0.9 $R_{SS}$+0.1 $R_B$, where $R_S$ is the equatorial crown radius of the tread, $R_{SS}$ is the equatorial radius of the center line of the carcass reinforcement, and $R_B$ is the radius of the bead seat measured on the line perpendicular to the axis of rotation of the tire and passing through the center of gravity of the cross section of the bead wire, and wherein said junction J is not covered on the axially outer wall of the tire by a joint cover.

2. A tire according to claim 1, wherein the circular junction J between the rubber mix of the tread and the rubber mix of the sidewall is close to at least one circumferential groove or channel in the sidewall, the mean radius $R_R$ of said groove or channel is between $R_C$+10 mm and $R_C$−10 mm, and the depth of said groove or channel is between 10 and 30% of the total sidewall thickness at the radius $R_R$.

3. A tire according to claim 2, wherein the cross section of said groove or channel is semicircular.

4. A tire according to claim 1, wherein the cross section of said groove or channel has a form defined by the succession of two arcs of a circle: a first, radially upper, concave arc of a circle, of radius r and of a length of between $\pi r/2$ and $\pi r$, extended tangentially by a second, convex arc of a circle, the radius of curvature r' of which lies between r and R', R being the radius of curvature of the outer wall of the sidewall measured at the radius $R_R$, said second arc of a circle also being tangent to said outer wall.

5. A tire comprising a carcass reinforcement anchored within each bead to a bead wire, a crown reinforcement and a tread joined to two beads by means of two sidewalls, the axially outer edges of the single mix of the tread being folded over onto the radially outer edges of the rubber mixes of the sidewalls, wherein the circular junction J between the single rubber mix of the tread and the rubber mix of the sidewall is positioned such that its radius $R_C$ on the axially outer wall of the tire lies firstly between 0.9 $R_S$+0.1 $R_B$ and 0.8 $R_S$+0.2 $R_B$ and secondly between $R_{SS}$ and 0.9 $R_{SS}$+0.1 $R_B$, $R_S$ being the equatorial crown radius of the tread, $R_{SS}$ the equatorial radius of the center line of the carcass reinforcement, and $R_B$ the radius of the bead seat measured on the line perpendicular to the axis of rotation of the tire passing through the center of gravity of the cross section of the bead wire, the circular junction J between the mixes in question being close to at least one circumferential groove or channel in the sidewall, the mean radius $R_R$ of said groove or channel being between $R_C$+10 mm and $R_C$−10 mm, the depth of said groove or channel being between 10 and 30% of The total sidewall thickness the radius $R_R$, and the cross section of said groove or channel having a form defined by the succession of two arcs of a circle: a first, radially upper, concave arc of a circle, of radius r and of a length of between $\pi r/2$ and $\pi r$, extended tangentially by a second, convex arc of a circle, the radius of curvature r' of which lies between r and R', R' being the radius of curvature of the outer wall of the sidewall measured at the radius $R_R$, said second arc of a circle also being tangent to said outer wall.

* * * * *